US007567805B2

(12) United States Patent  
Cox et al.

(10) Patent No.: US 7,567,805 B2
(45) Date of Patent: Jul. 28, 2009

(54) METHOD AND SYSTEM FOR DYNAMIC ASSIGNMENT OF WIRELESS LAN ACCESS POINT IDENTITY

(75) Inventors: Brian Cox, Redwood City, CA (US); Bruce McMurdo, San Jose, CA (US); Anuradha Gade, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 820 days.

(21) Appl. No.: 11/195,536

(22) Filed: Aug. 1, 2005

(65) Prior Publication Data

US 2007/0025306 A1 Feb. 1, 2007

(51) Int. Cl.
*H04W 4/00* (2006.01)

(52) U.S. Cl. .................. 455/435.1; 455/410; 455/411; 455/418; 455/420; 455/500; 455/502; 455/435.2; 370/252; 370/254; 709/220; 709/221; 709/222; 709/227; 709/228; 709/229

(58) Field of Classification Search ......... 455/410–411, 455/418–420, 414.1–2, 435.1–2, 500, 502, 455/68; 370/252–255, 350, 401, 389, 392, 370/326, 310, 338, 395.21, 412; 709/220–222, 709/227–229

See application file for complete search history.

(56) References Cited

U.S. PATENT DOCUMENTS 7,130,385 B1 * 10/2006 Moon ........................ 379/45
7,286,530 B2 * 10/2007 Lupper et al. ............... 370/389
7,385,947 B2 * 6/2008 Wu et al. .................... 370/328
2006/0114839 A1 * 6/2006 Meier et al. ................. 370/254

FOREIGN PATENT DOCUMENTS

EP 1-445-893 A2 8/2004

OTHER PUBLICATIONS

Cisco IOS Configuration Fundamentals Guide *Configuring Cisco Discovery Protocol*, pp. FC-277-FC-280.

(Continued)

*Primary Examiner*—Tuan A Tran
(74) *Attorney, Agent, or Firm*—Baker Botts L.L.P.

(57) ABSTRACT

In a wireless LAN (WLAN) a method and system for dynamically assigning a configuration identity to a device being connected to the WLAN is provided. An access point (AP) or other device is plugged into a switch port of an Ethernet switch, and discovers its location and the location of a WLAN management module. The device can then request its configuration identity from the WLAN management module by providing its switch and/or port location. When a device in the WLAN needs to be replaced, the method and system enable dynamic assignment of configuration identity for the new device, to ensure that the configuration and identity of the new device matches that of the device it is replacing.

24 Claims, 6 Drawing Sheets

OTHER PUBLICATIONS

Cisco Systems Data Sheet, *Ciscoworks Wireless LAN Solution Engine 2.9*, Copyright 1992-2004, Cisco Systems, Inc. pp. 1-17.

Narasimhan, P. (Aruba Networks), Harkins, D. (Trapeze Networks) and Ponnuswamy, S. (Aruba Networks): "SLAPP: Secure Light Access Point Protocol", The Internet Society (2005), May 31, 2005.

SpectrumSoft Wireless Network Management System, Spectrum 24 Software, publication date Jun. 30, 2000.

PCT Notification of Transmittal of the International Search Report and The Written Opinion of the International Searching Authority, dated Sep. 11, 2006, PCT Application No. PCT/US2006/029660.

* cited by examiner

| SwitchID/Port | SSID | Channel | Transmit Pwr | Physical Location | Beacon Interval |
|---|---|---|---|---|---|
| <default> | cisco_default | 1 | 5 dBm | N/A | 100ms |
| 1.1.1.1/<default> | cisco1 | 1 | 5 dBm | N/A | 100ms |
| 1.1.1.1/p#0 | cisco1 | 5 | 5 dBm | Bldg. 14; Rm 201 | 200ms |
| 1.1.1.1/p#1 | cisco1 | 11 | 7 dBm | Bldg. 14; Rm 202 | 100ms |
| 1.1.1.1/p#2 | cisco1 | 1 | 5 dBm | Bldg. 14; Rm 203 | 100ms |
| ... | | | | | |
| ... | | | | | |

METHOD AND SYSTEM FOR DYNAMIC ASSIGNMENT OF WIRELESS LAN ACCESS POINT IDENTITY

BACKGROUND OF THE INVENTION

With the proliferation of wireless devices, wireless Local Area Network (WLAN) systems allow companies to extend the benefits of networks to mobile workforces, as well as deliver new networking services and applications wirelessly. WLAN deployments may span 1000's of Access Points (APs) to provide wireless coverage and mobility services for a large user base associated with enterprises, as well as service providers offering wireless hotspots. Indeed, many businesses are moving towards a complete wireless office to save costs involved in wiring while enabling employee productivity. In a typical deployment configuration, APs are connected to an access layer wiring closet switch for enterprise connectivity.

If for some reason an access point should fail, it is important to handle replacement of the AP in the quickest possible time to minimize the adverse impact on network availability. Unlike wired access devices, APs often require a network administrator to configure a wide variety of operational parameters—such as radio channels, transmit power, Service Set Identifiers, etc.—to ensure proper operation of the AP at a given location. After a configuration parameter set is configured, a network administrator typically assigns a static identity to the AP and associates this identity to the parameter set. Assigning an identity to each AP statically, however, means that the identify needs to be reconfigured during device replacements. Especially in large network deployments, this may require a considerable amount of time, configuration overhead, and/or dedicated IT personnel with sufficient skill or knowledge to configure the newly installed access points. Thus, there is a need for dynamic assignment of AP identities so that when an AP needs to be replaced, the new AP can be configured with a desired set of operational parameters, such as the configuration parameters of the previous AP with minimized configuration overhead, and a quick turnaround time so as reduce the affect on network availability. Embodiments of the present invention substantially fulfill this need.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE INVENTION

The present invention provides, in one implementation, a method and system for dynamically assigning an identity to APs being deployed in a WLAN to allow for automatic configuration of operational parameters. In one implementation, the identity and associated configuration of a newly deployed AP is dynamically assigned based on physical network connection information, such as the switch and/or switch port to which the AP is connected. According to an implementation of the present invention, when an AP deployed and installed into a network environment, it sends out a discovery protocol message to discover physical network connection information, such as the identity of the switch, and port of the switch, to which the access point is connected. In one implementation, the AP may discover the identity of a WLAN management module as part of the process for obtaining a network address from a DHCP server. Using this information, the AP then sends a request for configuration information to the IP address of the WLAN management module. Upon receipt of the request, the management module generates a basic configuration for the AP (such as information sufficient to establish SNMP access to the AP) and transmits the information back to the AP.

The WLAN management module can also perform a security check on the received request for configuration information, and if it determines that the request is not valid, the WLAN management module will drop the request and will not provide any configuration information. Additionally, the management module may have additional configuration information specific to the switch and/or switch port, to which the AP is connected. The management module, in one implementation, interrogates the AP for its switch IP address and port number, and looks these attributes up in a configuration database, and provides any additional configuration information associated with that switch port to the AP. A system comprising means for performing the above functions is also set forth according to the present invention.

Figure 1A:
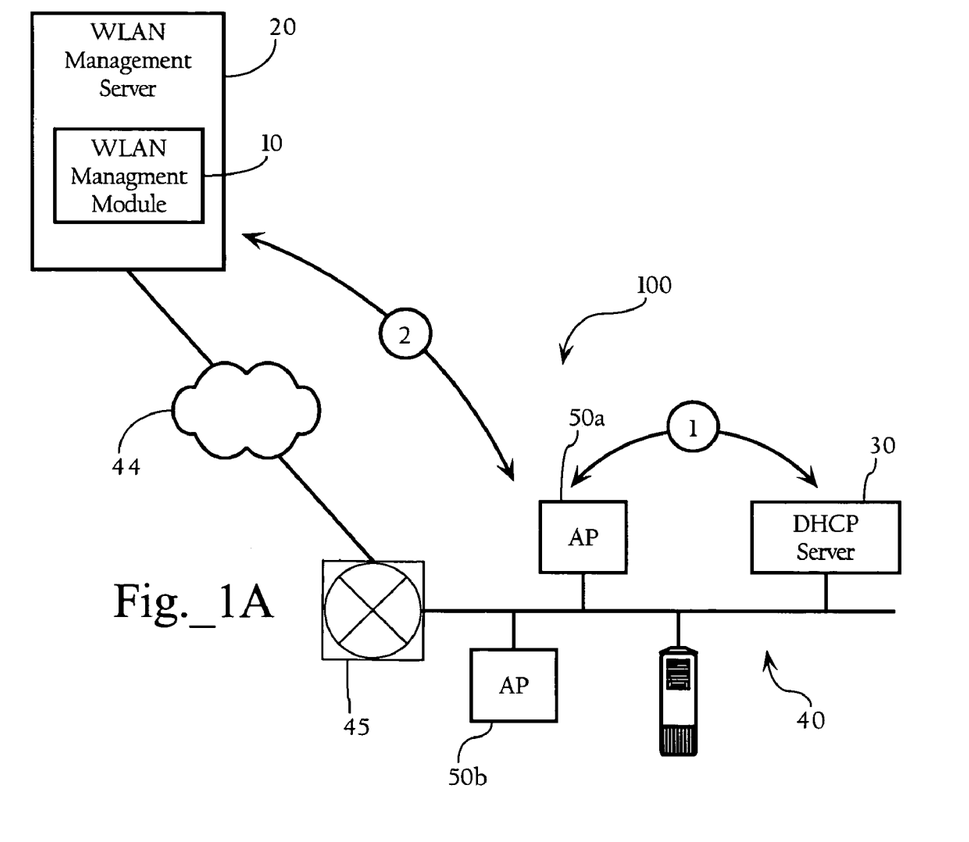
FIG. 1A is a simplified block diagram of the components and communication flow in a wireless local area network system in accordance with principles of the present invention.
Figure 1B:
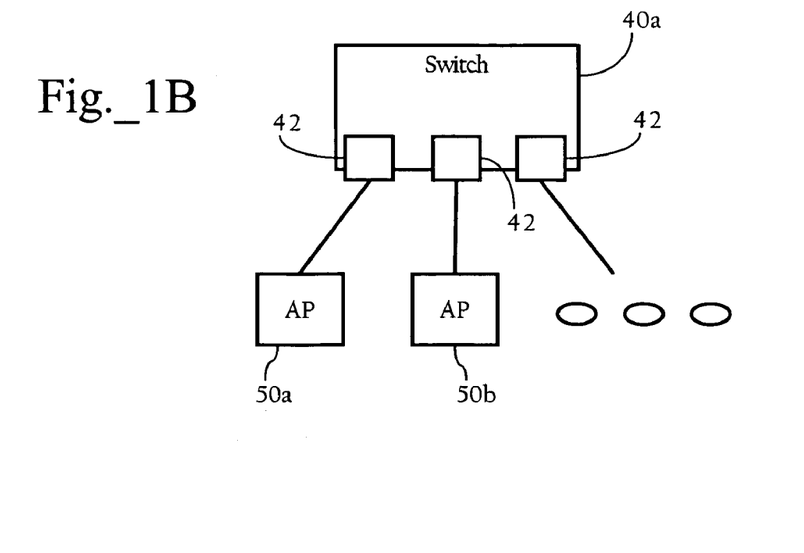
FIG. 1B is a functional block diagram illustrating a switch connected to various network devices including one or more access point devices.

A WLAN system according to principles of the present invention is shown in FIG. 1A. In a specific embodiment of the present invention, the system 100 includes a wireless LAN management module 10, running on a wireless LAN management server 20, for dynamically assigning a configuration identity to a network device being attached to the system, a dynamic host configuration protocol (DHCP) server 30, and AP devices 50a, 50b (collectively referred to as 50). FIG. 1A illustrates one possible network environment in which the invention may operate. As FIG. 1B illustrates, for example, network 40 may be a LAN or LAN segment implemented by an Ethernet switch 40a (or an array of switches) having multiple ports 42 to which AP devices 50, and DHCP server 30 are connected. Still further, router 45 and network 44, which may be a LAN, LAN segment, or a Wide Area Network (WAN), allow for the transmission of messages between WLAN management server 20 and AP devices 50. Other implementations are possible. For example, although DHCP server 30 is illustrated as being collocated with AP devices 50, it may be located on another LAN or LAN segment accessible over network 44.

Figure 7:
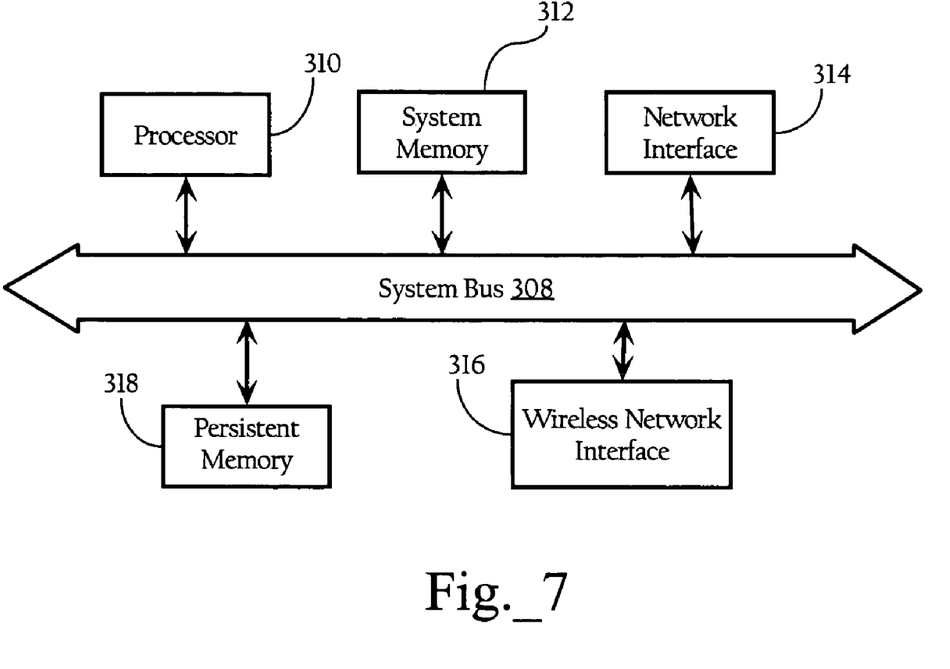
FIG. 7 is a functional block diagram illustrating the components of an access element according to one embodiment of the invention.

The access point devices 50 are used to wirelessly communicate with remote client devices or mobile stations (not shown). In one implementation, the access point devices 50 implement the wireless network protocol specified in the IEEE 802.11 specification. The access point devices 50 may be autonomous or so-called "fat" access points, or lightweight access points operating in connection with a wireless switch (not illustrated), as disclosed in U.S. patent application Ser. No. 10/407,584, now U.S. Pat. No. 7,212,837. The access point devices 50 are typically connected to the switch ports 42 via Ethernet links; however, other link layer connection protocols or communication means can be employed. In one implementation, an access point device 50 comprises a processor 310, a memory 312, a network interface 314 for communication with switch 40a, a wireless network interface 316 for communication with one or more mobile stations, a system bus 308 interconnecting these components (see FIG. 7). The access point devices 50 also include software modules (including DHCP clients, CDP modules, access point modules, SNMP functionality, etc.) and device drivers (e.g., network and WLAN interface drivers) stored in persistent memory 318 (e.g., a hard disk drive, flash memory, etc.). At start up, these software components are loaded into memory 312 and then accessed and executed by processor 310.

WLAN management server 20, in one implementation, comprises a processor, a memory, a network interface, and one more software applications (including WLAN management module 10) and drivers enabling the functions described herein. Furthermore, the WLAN management module 10, in one implementation, may comprise a Wireless LAN Solution Engine (WLSE) offered by Cisco Systems, Inc. of San Jose, Calif.

Figure 6:
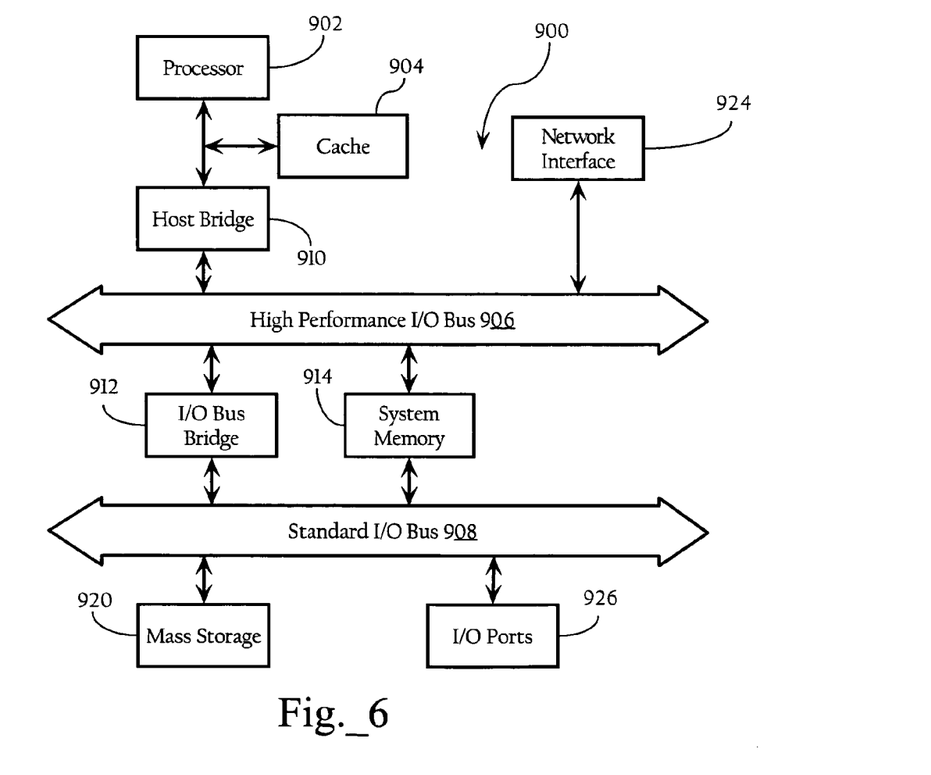
FIG. 6 is a functional block diagram illustrating the hardware components of a WLAN management server according to one embodiment of the present invention.

FIG. 6 illustrates, for didactic purposes, the hardware architecture of WLAN management server 10 according to one implementation of the present invention. The present invention, however, can be implemented on a wide variety of computer system architectures. An operating system manages and controls the operation of system 900, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

FIG. 6 illustrates one embodiment of a computer hardware system suitable for use with the present invention. In the illustrated embodiment, hardware system 900 includes processor 902 and cache memory 904 coupled to each other as shown. Additionally, hardware system 900 includes high performance input/output (I/O) bus 906 and standard I/O bus 908. Host bridge 910 couples processor 902 to high performance I/O bus 906, whereas I/O bus bridge 912 couples the two buses 906 and 908 to each other. Coupled to bus 906 are network/communication interface 924, and system memory 914. The hardware system may further include video memory (not shown), and a display device coupled to the video memory. Coupled to bus 908 are mass storage 920 and I/O ports 926. The hardware system may also include a keyboard and pointing device (not shown) coupled to bus 908. Collectively, these elements are intended to represent a broad category of computer hardware systems, including but not limited to general purpose computer systems based on the Pentium® processor manufactured by Intel Corporation of Santa, Clara, Calif., as well as any other suitable processor.

The elements of computer hardware system 900 perform their conventional functions known in the art. In particular, network interface 924 is used to provide communication between system 900 and any of a wide range of networks, such as an Ethernet (e.g., IEEE 802.3) network, etc. Mass storage 920 is used to provide permanent storage for the data and programming instructions to perform the above described functions implemented in the system controller, whereas system memory 914 (e.g., DRAM) is used to provide temporary storage for the data and programming instructions when executed by processor 902. I/O ports 926 are one or more serial and/or parallel communication ports used to provide communication between additional peripheral devices which may be coupled to hardware system 900.

Hardware system 900 may include a variety of system architectures and various components of hardware system 900 may be rearranged. For example, cache 904 may be on-chip with processor 902. Alternatively, cache 904 and processor 902 may be packed together as a "processor module", with processor 902 being referred to as the "processor core". Furthermore, certain implementations of the present invention may not require nor include all of the above components. For example, the peripheral devices shown coupled to standard I/O bus 908 may be coupled to high performance I/O bus 906; in addition, in some implementations only a single bus may exist with the components of hardware system 900 being coupled to the single bus. Furthermore, additional components may be included in system 900, such as additional processors, storage devices, or memories.

As discussed above, in one embodiment, the operations of the WLAN management server 20 described herein are implemented as a series of software routines run by hardware system 900 of FIG. 6. These software routines comprise a plurality or series of instructions to be executed by a processor in a hardware system, such as processor 902. Initially, the series of instructions are stored on a storage device, such as mass storage 920. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 924. The instructions are copied from the storage device, such as mass storage 920, into memory 914 and then accessed and executed by processor 902.

In accordance with one implementation of the present invention, when an access point device 50 is deployed in the WLAN and connected to a port 42 of the switch 40a implementing the LAN 40, it uses a link layer discovery mechanism, such as the Cisco Discovery Protocol (CDP), to collect information about the switch 40a. In one implementation, the access point device 50 transmits a discovery protocol message to indicate its presence on the WLAN to other devices (e.g., switch 40a), and to learn about its location in the network environment through a query-response mechanism. The access point device 50, in one implementation, also communicates with the DHCP server 30 to obtain an IP or other network address and the IP address for the WLAN management module 10, which the DHCP server 30 has been configured to provide. This exchange of information is depicted by the arrow labeled 1 in FIG. 1A.

The access point device 50 then uses the IP address of the WLAN management module 10 to request configuration information. In one implementation, the configuration of an access point device 50 proceeds in two phases. In a first phase, the access point device 50 receives, from the WLAN management module 10, a basic configuration set including SNMP credentials and the like. In one implementation, the access point device 50 sends a trivial FTP (TFTP) request to the WLAN management module 10, as indicated by the arrow labeled 2. The management module 10 can optionally perform a security check on the received request, such as filtering the request for a valid MAC address provided by the access point device 50, or making sure the request is received within a designated time frame specified by a network administrator in a configuration interface. If the security check fails, the request will be dropped. If the security check is successful, the management module 10 generates basic configuration information for the access point device 50, and sends this configuration information back to the access point device 50. In one implementation, the basic configuration information includes SNMP credentials which map to a subnet corresponding to the access point device 50. The access point device 50 stores and processes the received information and, in one implementation, waits for an interrogation request transmitted by the WLAN management module 10. In a second phase, the WLAN management module 10 interrogates the access point device 50 and provides configuration information, if any, based on the switch and port information provided by the access point device 50.

Figure 2:
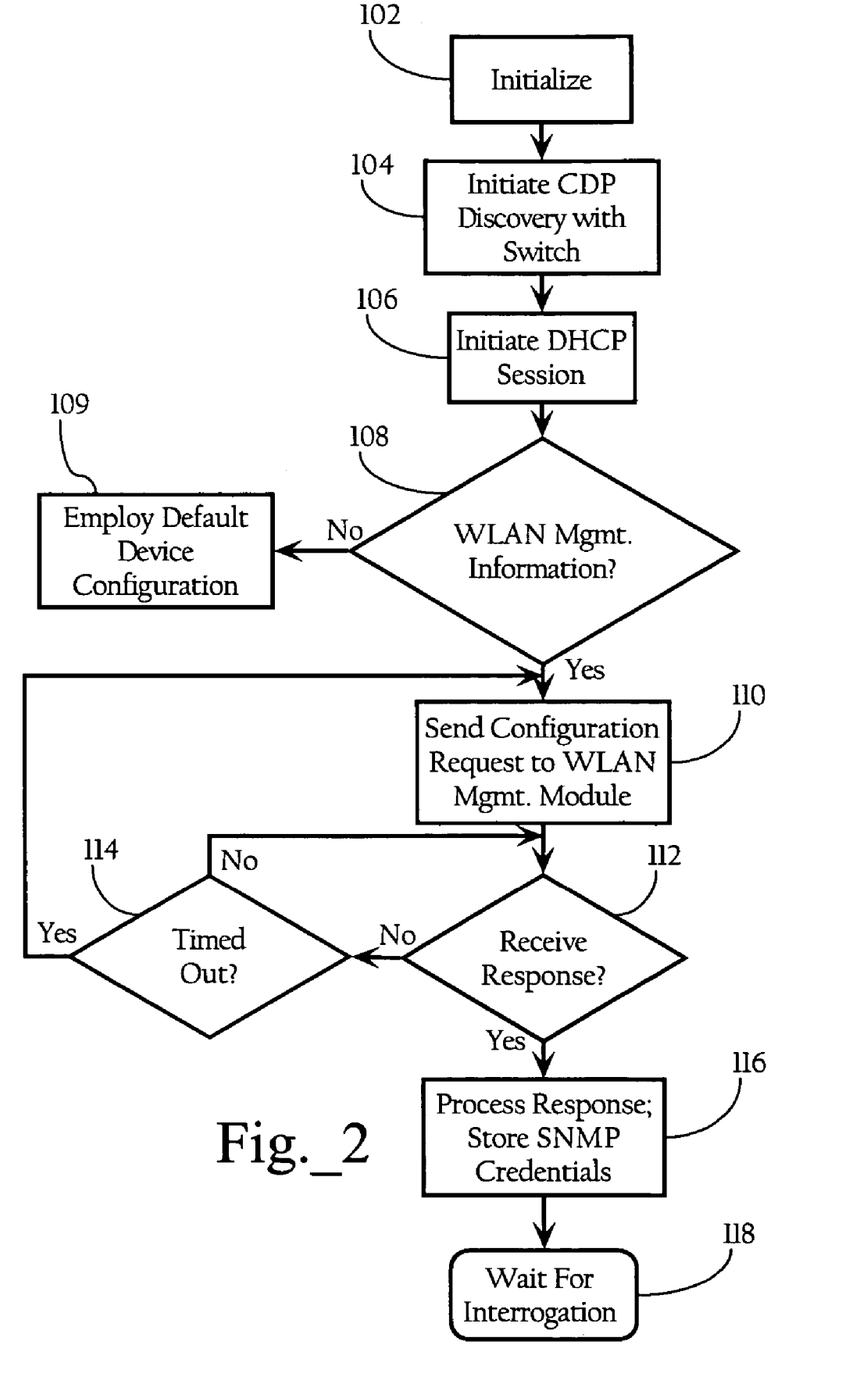
FIG. 2 is a flowchart illustrating steps of a method in accordance with one embodiment of the present invention.

Referring to FIG. 2, a flow chart illustrating a process executed by an access point device 50 upon initialization is shown. Assume for didactic purposes that a network administrator has inserted access point device 50*a* into a selected port 40 of switch 40*a*, and powered up the device. As FIG. 2 illustrates, access point device 50*a* boots up and initializes a configuration application (102). In one implementation, access point device 50 initiates a link layer discovery mechanism (104), such as transmitting (e.g., unicasting, broadcasting, multicasting, etc.) CDP discovery requests, to switch 40*a* to discover the IP address (and, optionally, a device name) of switch 40*a*, and the identifier of the port 42 to which the access point device 50*a* is connected. The CDP, in one embodiment, is continuous neighbor relationship; accordingly, while there is a discovery phase the CDP exchange is continuous and will capture any changes that occur during the lifetime of the adjacency between access point 50*a* and switch 40*a*. Other neighbor discovery mechanisms and protocols can also be used.

In one implementation, the access point device 50*a* stores the switch IP address, device name and port number in a Management Information Base (MIB), accessible to other devices via Simple Network Management Protocol (SNMP) queries. Prior to, concurrently with, or subsequently to, this switch/port discovery process, the access point device 50*a* initiates a DHCP session (106), broadcasting a DHCPDISCOVER packet which may be ultimately transmitted via BootP relay agents to DHCP server 30, to obtain an IP (or other network layer) address. Of course, other IP address assignment or configuration protocols, such as BootP, can also be used in connection with the present invention. In one implementation, the DHCP server 30 has been configured to append the IP address of WLAN management module 10 to the DHCPOFFER packet it transmits to the access point device 30. As FIG. 2 illustrates, in one implementation, access point device 50*a* checks whether the DHCPOFFER packet includes the IP address of the WLAN management module 10 (108). If no WLAN management module information is appended to the DHCPOFFER packet, access point 50*a*, in the implementation shown, uses a default, locally stored configuration (109). However, if the DHCP message contains the network address of WLAN management module 10, access point device 50*a* sends an initial configuration request to WLAN management module 10 (110), and waits for a response (112). If the response times out (114), access point device 50*a* retransmits the request. When a response is received, access point device 50*a* processes the response, storing any SNMP credentials contained in the response. As discussed above, in one implementation, the response to the initial configuration request includes a baseline configuration that, in one implementation, facilitates further configuration of the access point device 50*a*. As FIG. 2 illustrates, access point device 50*a* then waits for an interrogation request from the WLAN management module 10 (118). In one implementation, while in this listening mode, access point 50*a* is not operational; rather, it only responds to SNMP requests from WLAN management module 10. Of course, other configurations are possible. For example, the access point device 50*a* may be configured to discover WLAN management module 10 through alternative discovery mechanisms, such as Layer 3 discovery mechanisms.

Figure 3:
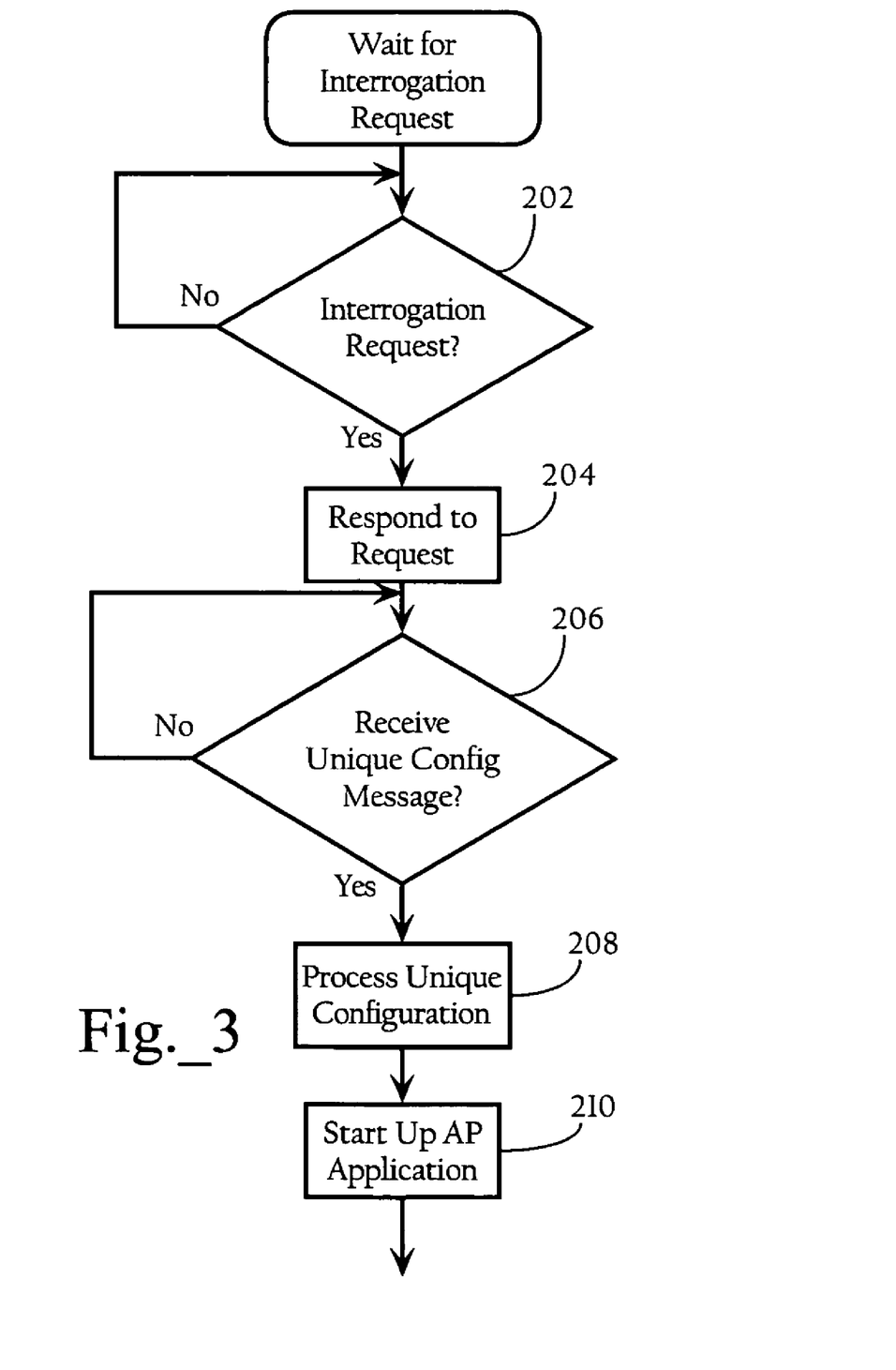
FIG. 3 is a flowchart illustrating steps of a method in accordance with another embodiment of the present invention.

FIG. 3 illustrates a process flow, implemented at access point device 50*a*, directed to waiting for an interrogation request from WLAN management module and, ultimately, receiving a device configuration that maps to the switch/port to which the access point device 50*a* is connected. As FIG. 3 illustrates, access point 50*a* listens for an interrogation request from WLAN management module 10 (202). When it receives the request, access point device 50*a* transmits a response to the request that includes the IP address of switch 40*a* and the identifier of the port 42 to which the access point device 50*a* is connected (204). Access point device 50*a* then waits for a configuration message from WLAN management module 10 (206). After the configuration message is received, access point device 50 processes the configuration message, setting its operational parameters based on the information in the message, (208) and initializes the software application or other executable code object to enter an operational mode. In one implementation, the access point device 50*a* then begins to operate in an access point mode consistent with the configuration specified in the configuration message.

Figure 4:
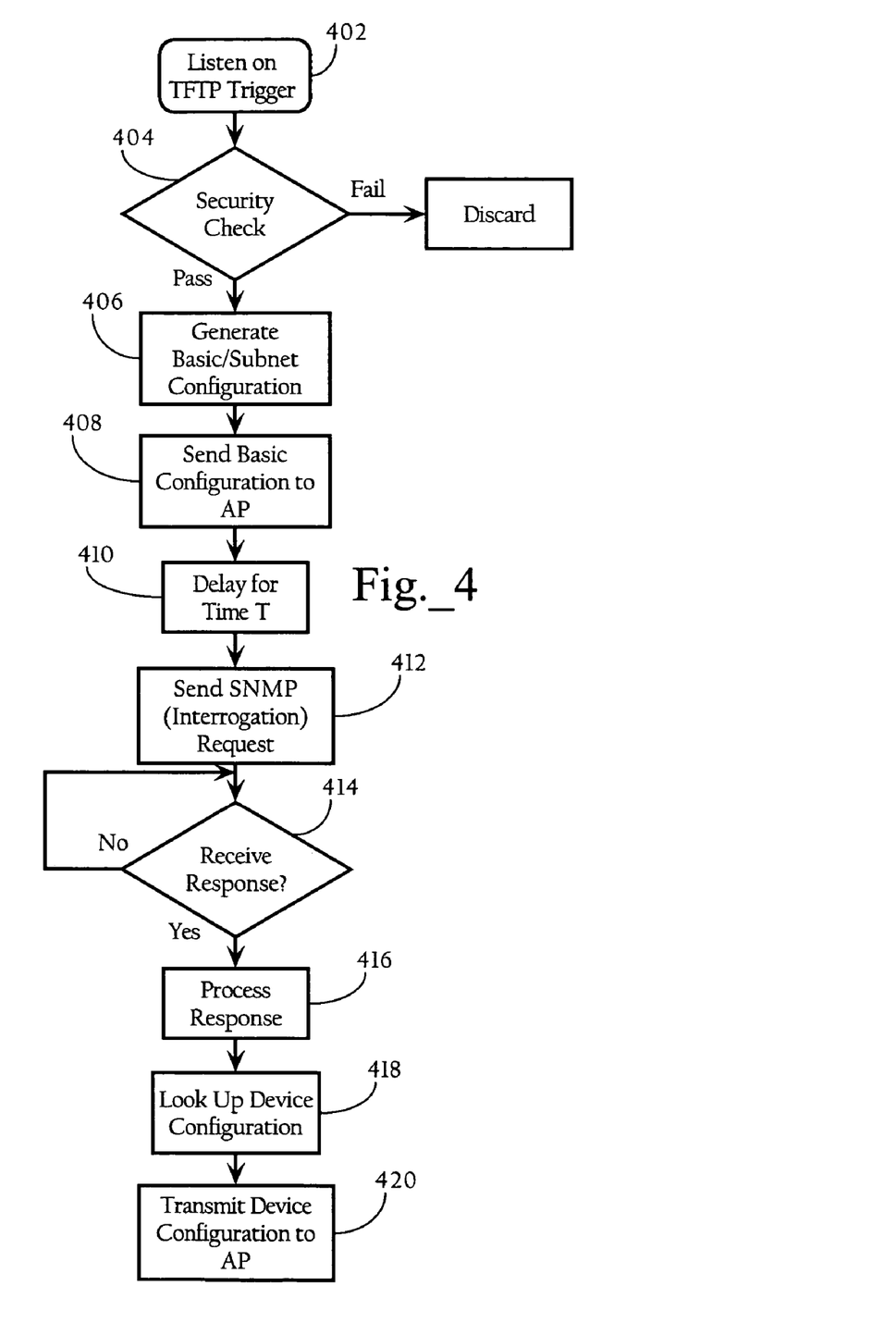
FIG. 4 is a flowchart illustrating steps of a method in accordance with another embodiment of the present invention.

FIG. 4 illustrates a process flow, according to one implementation of the present invention, for dynamically assigning a configuration identity of a device according to an embodiment of the present invention is shown. As discussed above, WLAN management module 10 listens on a UDP port for TFTP requests transmitted by devices, such as access point devices 50 (402). In response to a request, WLAN management module 10 can perform security checks, as discussed herein, on the request (404). The security check can involve filtering (e.g., by IP address, etc.), or a timeout period, or any other suitable mechanism for validating a request. Those skilled in the art would recognize the security check as an optional validation mechanism that is not required to be performed in order to practice the present invention. If the request passes the security check, WLAN management module 10 generates a basic configuration (406) and transmits the basic configuration to the requesting access point device 50*a* (408). As discussed above, the basic configuration includes SNMP credentials, as well as authentication or security information (e.g., password information, and/or the location of a network authentication device, etc.). In one implementation, the basic configuration may be specific to the subnet to which the requesting access point 50*a* is connected. As FIG. 4 illustrates, WLAN management module 10 then waits for a time T to allow the access point 50a to receive and process the basic configuration (410). In one implementation, T is configured to allow access point 50a sufficient time to discover switch and port identity information from switch 40a. In another implementation, T is configured merely to allow access point 50a sufficient time to process the basic configuration information received in the first phase. WLAN management module then transmits an SNMP request to retrieve the switch and port information from access point 50a (412). After a SNMP response is received and processed (414, 416), WLAN management module 10 consults a configuration database (see FIG. 5) to look up a device configuration that maps to the information provided by access point 50a (418), and transmits the resulting device configuration to the access point 50a (420).

Figure 5:
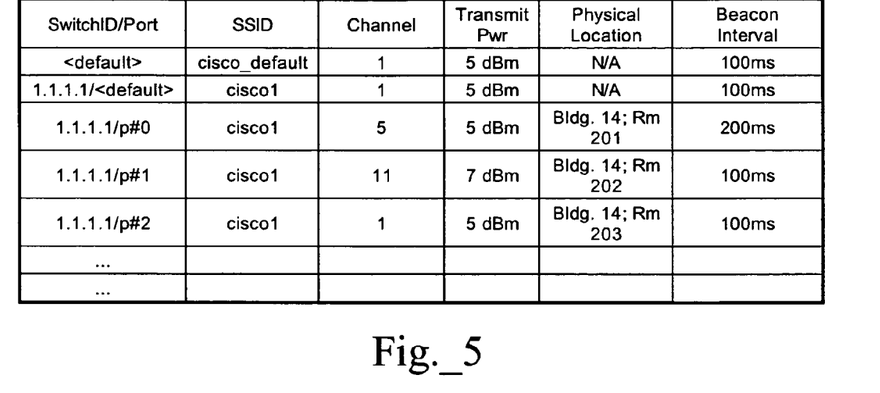
FIG. 5 is an exemplary database table of configuration information used in accordance with the present invention to dynamically assign a configuration identity to a device connected to the WLAN.

FIG. 5 illustrates, for didactic purposes, a device configuration database according to one implementation of the present invention. Referring to FIG. 5, a table is shown which lists exemplary configuration attributes for device identities located by their switch IP address and port number. Other database configurations can also be employed. The table illustrated in FIG. 5 may be maintained in a device configuration database maintained locally at WLAN management server 20 or in a remote database server. The device configuration information stored in this table can be programmed by a network administrator and mapped to a given switch and/or port. As FIG. 5 shows, configuration parameters may include Service Set Identifiers (SSID), operating channels, transmit power levels, and beacon intervals. Configuration information may also include a selected operational mode, such as access point mode, scanner mode, etc. In one implementation, the configuration parameter database may also include the approximate physical location of the device. That is, since a physical cable physically connects the switch 40a to the access point device 50a, the physical location is known based on the termination point of the cable. As FIG. 5 shows, the physical location information may identify a building and/or room. In other implementations, the physical location may be specified in absolute or relative geographical coordinates. The WLAN management module 10, in one implementation, may use this physical location information to compute or derive one or more configuration parameters, such as transmit power levels and channel assignments. For example, in one implementation, WLAN management module 10 may query the device configuration database to identify the access point devices within a threshold proximity (as reflected in the configuration database) of the requesting access point 50a, transmit SNMP queries to identify the operating channels and transmit power levels of the identified neighboring access points, and use these values to assign a channel and transmit power level to the requesting access point 50a. Still further, the WLAN management module 10 can be configured to return, in response to the switch/port (or other physical network connection) information, location information to the access point device 50a. For example, the returned location information may comprise the relative locations of other access point devices 50 within a threshold proximity to the requesting access point 50a. Access point 50a can use this information to compute or derive one or more operational parameters, such as channel assignments, transmit power and the like.

Furthermore, as FIG. 5 illustrates, the device configuration database contains one or more <default> entries. For example, if the switch-port pair information provided by an access point device 50 is not found in the database, WLAN management module 10 locates the most-specific <default> entry that matches the provided information. For example, if the identified switch matches the 1.1.1.1 entry, but the identified port identifier finds no match, WLAN management module 10 returns the configuration information corresponding to the 1.1.1.1/<default> entry.

Implementations of the present invention can be configured to provide several benefits. For example, in some implementations, the above-described invention enables quick replacement/substitution of APs in a wireless LAN by dynamically assigning the configuration identity of an AP based on the switch port to which the AP is connected. Since a WLAN in accordance with the present invention maintains a configuration database with configuration details for switch ports in the network, when an AP needs to be replaced, the new AP can be seamlessly configured the same way as the old AP with a quick turnaround time merely by plugging the AP into the desired port 42 of switch 40a. Still further, WLAN administrators are more and more interested in enabling sensors in every site to monitor intrusions, and suspicious activity. Administrators can optimize the placement of scanners for better reception range. They can use a process by which they use a certain port on a network switch to connect to the scanner, while other ports are used for providing regular WLAN access. When a scanner needs to be replaced, an administrator can just swap the unit and let it derive it's configuration identify based on the pre-defined policies associated to switch port location.

Additionally, switch port mapping allows a linkage between access point configurations, as the access point configuration and the switch port map directly to the cable plant, which corresponds to a specific location. This enables the access point configuration to be mapped directly to a cabling plan without performing a local configuration or naming process. Furthermore, since the WLAN management module maintains the configuration database with the mapping of switch ports to the AP or object being managed, the system can dynamically update its database when there are replacements or changes.

The foregoing description of the embodiments of the invention has been presented for the purpose of illustration and description only. It is not intended to be exhaustive or to limit the invention to the specific forms disclosed. Many modifications and variations are possible in light of the above teaching. For example, in other implementations, the access points can be configured to initiate the second phase of the configuration, as opposed to the WLAN management module 10. In addition, other functionality associated with network 40, beyond DHCP server 30, may be configured to provide the IP address of the WLAN management module 10 during the CDP or other discovery protocol process In addition, the above described mechanism can be extended to any centralized management system that manages configurations for network devices (e.g., a plurality of access layer switches operating, a plurality of network-attached telemetry devices, or a set of cable head-end systems), and is not limited to the above-described wireless LAN environment. It is intended that the scope of the invention be limited by the claims appended hereto, and not by the detailed description.

What is claimed is:

1. A method for dynamically assigning a configuration identity to a network device, the method comprising:
receiving a first request from a network device;
generating a basic configuration for the network device, wherein the basic configuration comprises simple network management protocol (SNMP) credentials for the network device;
providing the basic configuration to the network device;
waiting for a predefined time period;

transmitting an SNMP request to the network device after the predefined time period to request physical network connection information;

receiving the physical network connection information from the network device;

accessing a device configuration database to identify configuration information that corresponds to the physical network connection information; and providing at least a portion of the identified configuration information to the network device.

2. The method of claim 1 wherein the physical network connection information comprises a switch identifier corresponding to a network switch.

3. The method of claim 2 wherein the physical network connection information further comprises a port identifier corresponding to a port on the network switch to which the network device is connected.

4. The method of claim 1 wherein the configuration information comprises at least one operational parameter.

5. The method of claim 1 wherein the configuration information comprises physical location information; and wherein the method further comprises computing an operational parameter for the network device based at least in part on the physical location information corresponding to the network device.

6. An apparatus for dynamically assigning a configuration identity to a network device, comprising:
- a device configuration database including physical network connection information that maps to a plurality of device configuration information sets;
- a processor;
- a memory; and
- a network device configuration application, physically stored in the memory, comprising instructions operable to cause the processor and the apparatus to:
  - receive a first request from a network device;
  - generate a basic configuration for the network device, wherein the basic configuration comprises simple network management protocol (SNMP) credentials for the network device;
  - provide the basic configuration to the network device;
  - wait for a predefined time period;
  - transmitting an SNMP request to the network device after the predefined time period to request physical network connection information;
  - receive the physical network connection information from the network device;
  - access the device configuration database to identify a device configuration information set that corresponds to the physical network connection information; and
  - provide at least a portion of the configuration information in the identified configuration information set to the network device.

7. The apparatus of claim 6 wherein the physical network connection information comprises a switch identifier corresponding to a network switch.

8. The apparatus of claim 7 wherein the physical network connection information further comprises a port identifier corresponding to a port on the network switch to which the network device is connected.

9. The apparatus of claim 6 wherein the configuration information comprises at least one operational parameter.

10. The apparatus of claim 6 wherein the configuration information comprises physical location information; and wherein the network device configuration application further comprises instructions operable to cause the processor and the apparatus to compute an operational parameter for the network device based at least in part on the physical location information corresponding to the network device.

11. An apparatus for dynamically assigning a configuration identity to a network device, comprising:
- means for storing network device configuration information including physical network connection information that maps to a plurality of device configuration information sets;
- means for receiving a first request from a network device;
- means for generating a basic configuration for the network device, wherein the basic configuration comprises simple network management protocol (SNMP) credentials for the network device;
- means for providing the basic configuration to the network device;
- means for waiting for a predefined time period;
- means for transmitting an SNMP request to the network device after the predefined time period to request physical network connection information;
- means for receiving the physical network connection information from the network device;
- means for accessing the device configuration database to identify configuration information that corresponds to the physical network connection information; and
- means for providing at least a portion of the identified configuration information to the network device.

12. In a network device attached to a network, a method for obtaining dynamic network device identity information, comprising:
- transmitting a first request to a device configuration management module;
- receiving a basic configuration for the network device from the device configuration management module, wherein the basic configuration comprises simple network management protocol (SNMP) credentials for the network device;
- processing the basic configuration;
- storing the SNMP credentials;
- discovering physical network connection information;
- receiving an SNMP request for the physical network connection information from the device configuration management module;
- providing the physical network connection information to the device configuration management module; and
- receiving configuration information from the device configuration management module, wherein at least a portion of the configuration information maps to the physical network configuration information.

13. The method of claim 12 wherein the physical network connection information comprises a switch identifier corresponding to a network switch.

14. The method of claim 13 wherein the physical network connection information further comprises a port identifier corresponding to a port on the network switch to which the network device is connected.

15. The method of claim 12 wherein the configuration information comprises at least one operational parameter.

16. The method of claim 12 further comprising discovering the network address of the device configuration management module.

17. The method of claim 12 wherein the configuration information comprises location information specific to the network device; and wherein the method further comprises computing at least one configuration parameter based on the location information.

18. An apparatus for dynamically obtaining a configuration identity, comprising:

a network interface;
a processor;
a memory; and
a configuration application, physically stored in the memory, comprising instructions operable to cause the processor and the apparatus to:
- transmit a first request to a device configuration management module;
- receive a basic configuration from the device configuration management module, wherein the basic configuration comprises simple network management protocol (SNMP) credentials;
- store the SNMP credentials;
- discover physical network connection information;
- receive an SNMP request from the device configuration management module requesting the physical network connection information;
- provide the physical network connection information to the device configuration management module; and
- receive configuration information, wherein at least a portion of the configuration information maps to the physical network configuration information.

19. The apparatus of claim 18 wherein the physical network connection information comprises a switch identifier corresponding to a network switch.

20. The apparatus of claim 19 wherein the physical network connection information further comprises a port identifier corresponding to a port on the network switch to which the network device is connected.

21. The apparatus of claim 18 wherein the configuration information comprises at least one operational parameter.

22. The apparatus of claim 18 wherein the configuration application further comprises instructions operable to cause the processor and the apparatus to discover the network address of the device configuration management module.

23. The apparatus of claim 18 wherein the configuration information comprises location information specific to the network device; and wherein the configuration application further comprises instructions operable to cause the processor and the apparatus to compute at least one configuration parameter based on the location information.

24. An apparatus for dynamically obtaining a configuration identity, comprising:
- means for communicating with a network;
- means for transmitting a first request to a device configuration management module;
- means for receiving a basic configuration from the device configuration management module, wherein the basic configuration comprises simple network management protocol (SNMP) credentials;
- means for storing the SNMP credentials;
- means for discovering physical network connection information;
- means for receiving an SNMP request from the device configuration management module requesting the physical network connection information;
- means for providing the physical network connection information to the device configuration management module; and
- means for receiving configuration information, wherein at least a portion of the configuration information maps to the physical network configuration information.

* * * * *